US010511621B1

(12) United States Patent
Thomson et al.

(10) Patent No.: US 10,511,621 B1
(45) Date of Patent: *Dec. 17, 2019

(54) APPARATUSES, METHODS AND SYSTEMS FOR A CYBER THREAT CONFIDENCE RATING VISUALIZATION AND EDITING USER INTERFACE

(71) Applicant: Lookingglass Cyber Solutions, Inc., Baltimore, MD (US)

(72) Inventors: Allan Thomson, Pleasanton, CA (US); Christopher D. Coleman, Centreville, VA (US)

(73) Assignee: Lookingglass Cyber Solutions, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/456,263

(22) Filed: Mar. 10, 2017

Related U.S. Application Data

(63) Continuation of application No. 14/833,975, filed on Aug. 24, 2015, now Pat. No. 9,596,256, which is a continuation of application No. 14/339,441, filed on Jul. 23, 2014, now Pat. No. 9,118,714.

(51) Int. Cl.
*H04L 29/06* (2006.01)
*G06T 11/20* (2006.01)

(52) U.S. Cl.
CPC ........ *H04L 63/1433* (2013.01); *G06T 11/206* (2013.01)

(58) Field of Classification Search
CPC .......................... H04L 63/1433; G06T 11/206
See application file for complete search history.

(56) References Cited

U.S. PATENT DOCUMENTS

| 5,202,661 | A | | 4/1993 | Everett, Jr. et al. |
| 5,574,828 | A | * | 11/1996 | Hayward ............. G06F 19/325 706/45 |
| 5,840,581 | A | | 11/1998 | Carraway et al. |
| 6,839,850 | B1 | | 1/2005 | Campbell et al. |
| 6,995,660 | B2 | | 2/2006 | Yannone et al. |

(Continued)

OTHER PUBLICATIONS

Malik et al., Threat Modeling in Pervasive Computing Paradigm, ESR, 2008.*

(Continued)

*Primary Examiner* — David Garcia Cervetti
(74) *Attorney, Agent, or Firm* — Cooley LLP

(57) ABSTRACT

The cyber threat intelligence confidence rating visualization and editing user interface technology (hereinafter "TIC") provides a user interface that allows a user (e.g., a cyber threat analyst, etc.) to submit ratings for various characteristics associated with a cyber threat indicator. In one embodiment, the TIC may instantiate a user interactive risk evaluation component having a user interface input element for a user to submit calculation weights for one or more characteristics of a cyber threat; generate a graphical representation of a cyber threat confidence score for user interface display via the user interactive risk evaluation component; and dynamically adjust the graphical representation of the threat confidence score using at least one of the one or more characteristics weighted by the user configured weight.

22 Claims, 10 Drawing Sheets

(56) References Cited

U.S. PATENT DOCUMENTS

| | | | |
|---|---|---|---|
| 7,536,331 B1* | 5/2009 | Pellegrino | G06Q 40/00 705/35 |
| 7,707,192 B1* | 4/2010 | Lu | G06Q 10/00 707/687 |
| 7,865,427 B2* | 1/2011 | Wright | G06Q 20/04 705/35 |
| 7,873,998 B1 | 1/2011 | Wilkinson et al. | |
| 8,191,149 B2 | 5/2012 | Yun et al. | |
| 8,201,257 B1 | 6/2012 | Andres et al. | |
| 8,209,758 B1 | 6/2012 | Doukhvalov et al. | |
| 8,214,904 B1 | 7/2012 | Doukhvalov et al. | |
| 8,286,239 B1 | 10/2012 | Sutton | |
| 8,332,947 B1 | 12/2012 | Bregman et al. | |
| 8,402,012 B1* | 3/2013 | Herz | G06F 16/958 707/708 |
| 8,413,244 B1 | 4/2013 | Nachenberg | |
| 8,478,688 B1* | 7/2013 | Villa | G06Q 40/02 705/35 |
| 8,484,149 B1 | 7/2013 | Kelly | |
| 8,495,745 B1* | 7/2013 | Schrecker | G06F 21/577 726/25 |
| 8,516,597 B1* | 8/2013 | Sharma | G06F 21/577 705/38 |
| 8,544,098 B2 | 9/2013 | Gustave et al. | |
| 8,595,845 B2 | 11/2013 | Basavapatna et al. | |
| 8,621,618 B1* | 12/2013 | Ramsey | H04L 63/1408 370/392 |
| 8,627,463 B1 | 1/2014 | Glick et al. | |
| 8,677,448 B1* | 3/2014 | Kauffman | G06F 21/604 726/1 |
| 8,707,431 B2 | 4/2014 | Stephens et al. | |
| 8,776,180 B2 | 7/2014 | Kumar et al. | |
| 8,793,789 B2 | 7/2014 | Sorensen et al. | |
| 8,799,462 B2 | 8/2014 | McHugh et al. | |
| 8,800,034 B2 | 8/2014 | McHugh et al. | |
| 8,813,236 B1 | 8/2014 | Saha et al. | |
| 8,832,832 B1* | 9/2014 | Visbal | H04L 63/1441 726/22 |
| 8,868,472 B1* | 10/2014 | Lin | G06N 20/00 706/12 |
| 8,868,728 B2 | 10/2014 | Margolies et al. | |
| 8,966,639 B1* | 2/2015 | Roytman | H04L 63/1433 726/22 |
| 8,966,640 B1 | 2/2015 | Peddada et al. | |
| 8,984,643 B1* | 3/2015 | Krisher | H04L 63/1433 726/25 |
| 9,015,843 B2 | 4/2015 | Griffin et al. | |
| 9,065,849 B1 | 6/2015 | Rivera et al. | |
| 9,118,702 B2 | 8/2015 | MaCaulay | |
| 9,118,714 B1* | 8/2015 | Thomson | H04L 63/1441 |
| 9,152,790 B1 | 10/2015 | Glick et al. | |
| 9,160,730 B2* | 10/2015 | Sheller | H04L 63/08 |
| 9,166,999 B1 | 10/2015 | Kulkarni et al. | |
| 9,210,185 B1* | 12/2015 | Pinney Wood | G06F 16/9024 |
| 9,239,922 B1 | 1/2016 | Zhu et al. | |
| 9,338,181 B1* | 5/2016 | Burns | H04L 63/1433 |
| 9,516,053 B1* | 12/2016 | Muddu | G06F 16/254 |
| 9,536,191 B1* | 1/2017 | Arel | G06N 3/08 |
| 9,565,208 B2* | 2/2017 | Ibatullin | H04L 63/145 |
| 9,596,256 B1 | 3/2017 | Thomson et al. | |
| 9,965,937 B2* | 5/2018 | Cohen | G06F 3/04842 |
| 2002/0042687 A1 | 4/2002 | Tracy et al. | |
| 2002/0069035 A1 | 6/2002 | Tracy et al. | |
| 2003/0050718 A1 | 3/2003 | Tracy et al. | |
| 2003/0217039 A1 | 11/2003 | Kurtz et al. | |
| 2003/0225651 A1* | 12/2003 | Chen | G06Q 10/08 705/36 R |
| 2004/0044912 A1 | 3/2004 | Connary et al. | |
| 2004/0073810 A1 | 4/2004 | Dettinger et al. | |
| 2004/0078384 A1 | 4/2004 | Keir et al. | |
| 2005/0093675 A1 | 5/2005 | Wood et al. | |
| 2005/0187934 A1 | 8/2005 | Motsinger et al. | |
| 2006/0031217 A1* | 2/2006 | Smith | G06K 9/00711 |
| 2006/0031266 A1 | 2/2006 | Colbeck et al. | |
| 2006/0064374 A1* | 3/2006 | Helsper | G06Q 20/10 705/39 |
| 2006/0149580 A1* | 7/2006 | Helsper | G06Q 30/06 235/383 |
| 2006/0259336 A1* | 11/2006 | Anas | G06Q 10/04 705/7.17 |
| 2007/0006026 A1 | 1/2007 | Roychowdhary et al. | |
| 2007/0016542 A1* | 1/2007 | Rosauer | G06N 5/022 706/21 |
| 2007/0016955 A1 | 1/2007 | Goldberg et al. | |
| 2007/0038568 A1* | 2/2007 | Greene | G06Q 20/40 705/50 |
| 2007/0089171 A1 | 4/2007 | Aharon et al. | |
| 2007/0192865 A1 | 8/2007 | Mackin | |
| 2008/0005174 A1 | 1/2008 | Stephenson | |
| 2008/0010225 A1 | 1/2008 | Gonsalves et al. | |
| 2008/0010605 A1 | 1/2008 | Frank | |
| 2008/0010678 A1* | 1/2008 | Burdette | G06Q 30/0603 726/15 |
| 2008/0015913 A1* | 1/2008 | Courtney | G06Q 10/06 705/7.28 |
| 2008/0028470 A1* | 1/2008 | Remington | G06F 21/33 726/25 |
| 2008/0033935 A1 | 2/2008 | Frank | |
| 2008/0047017 A1 | 2/2008 | Renaud | |
| 2008/0052638 A1 | 2/2008 | Frank et al. | |
| 2008/0065685 A1 | 3/2008 | Frank | |
| 2008/0082352 A1* | 4/2008 | Schmidtler | G06Q 10/10 705/2 |
| 2008/0133190 A1 | 6/2008 | Peretz et al. | |
| 2008/0134145 A1* | 6/2008 | Halcrow | G06F 8/65 717/124 |
| 2008/0140576 A1* | 6/2008 | Lewis | G06Q 10/0635 705/67 |
| 2008/0189788 A1* | 8/2008 | Bahl | G06F 21/577 726/25 |
| 2008/0255993 A1 | 10/2008 | Blinbautn | |
| 2008/0271143 A1* | 10/2008 | Stephens | H04L 41/5061 726/22 |
| 2009/0007271 A1 | 1/2009 | Huang et al. | |
| 2009/0007272 A1 | 1/2009 | Huang et al. | |
| 2009/0052622 A1 | 2/2009 | Dugan et al. | |
| 2009/0077663 A1 | 3/2009 | Sun et al. | |
| 2009/0083695 A1 | 3/2009 | Mir et al. | |
| 2009/0182700 A1 | 6/2009 | Hodges | |
| 2009/0228316 A1 | 9/2009 | Foley et al. | |
| 2009/0282476 A1 | 11/2009 | Nachenberg et al. | |
| 2009/0300711 A1* | 12/2009 | Tokutani | G06F 21/554 726/1 |
| 2009/0328209 A1 | 12/2009 | Nachenberg | |
| 2010/0007489 A1 | 1/2010 | Misra et al. | |
| 2010/0031353 A1 | 2/2010 | Thomas et al. | |
| 2010/0076748 A1 | 3/2010 | Auerbach | |
| 2010/0077445 A1 | 3/2010 | Schneider et al. | |
| 2010/0094767 A1* | 4/2010 | Miltonberger | G06Q 10/067 705/325 |
| 2010/0100204 A1* | 4/2010 | Ng | A63F 13/12 700/91 |
| 2010/0114634 A1* | 5/2010 | Christiansen | G06Q 10/06 705/7.28 |
| 2010/0125911 A1 | 5/2010 | Bhaskaran | |
| 2010/0153146 A1* | 6/2010 | Angell | G06Q 10/0635 705/7.28 |
| 2010/0153147 A1* | 6/2010 | Angell | G06Q 10/04 705/7.28 |
| 2010/0153156 A1* | 6/2010 | Guinta | G06Q 10/0635 705/7.28 |
| 2010/0204969 A1 | 8/2010 | Hariharan et al. | |
| 2010/0250342 A1 | 9/2010 | Chandra | |
| 2011/0035784 A1 | 2/2011 | Jakobsson | |
| 2011/0040825 A1 | 2/2011 | Ramzan et al. | |
| 2011/0067005 A1* | 3/2011 | Bassin | G06F 11/008 717/127 |
| 2011/0167011 A1 | 7/2011 | Paltenghe et al. | |
| 2011/0185056 A1 | 7/2011 | McHugh et al. | |
| 2011/0258683 A1* | 10/2011 | Cicchitto | G06F 21/604 726/4 |

(56) References Cited

U.S. PATENT DOCUMENTS

| | | | |
|---|---|---|---|
| 2012/0030083 A1 | 2/2012 | Newman et al. | |
| 2012/0096552 A1* | 4/2012 | Paek | G06F 21/552 726/23 |
| 2012/0180124 A1* | 7/2012 | Dallas | G06F 21/46 726/22 |
| 2012/0233698 A1 | 9/2012 | Watters et al. | |
| 2012/0268269 A1* | 10/2012 | Doyle | G08B 21/0202 340/539.13 |
| 2012/0311708 A1 | 12/2012 | Agarwal et al. | |
| 2013/0024239 A1* | 1/2013 | Baker | G06Q 40/06 705/7.28 |
| 2013/0028114 A1* | 1/2013 | Gutierrez, Jr. | G06Q 10/06393 370/252 |
| 2013/0138439 A1* | 5/2013 | Marcus | G10L 15/22 704/240 |
| 2013/0191919 A1* | 7/2013 | Basavapatna | G06F 21/577 726/25 |
| 2013/0197998 A1* | 8/2013 | Buhrmann | G06Q 30/0255 705/14.53 |
| 2013/0212684 A1 | 8/2013 | Li et al. | |
| 2013/0247205 A1 | 9/2013 | Sehreeker et al. | |
| 2014/0007179 A1* | 1/2014 | Moore | G06F 21/316 726/1 |
| 2014/0007238 A1* | 1/2014 | Magee | G06F 21/577 726/24 |
| 2014/0041028 A1 | 2/2014 | Ramsey et al. | |
| 2014/0173738 A1 | 6/2014 | Condrey et al. | |
| 2014/0181968 A1 | 6/2014 | Ge et al. | |
| 2014/0241517 A1 | 8/2014 | Varoglu et al. | |
| 2014/0279767 A1* | 9/2014 | Torgersrud | G06N 5/02 706/14 |
| 2014/0344926 A1 | 11/2014 | Cunningham et al. | |
| 2014/0351939 A1* | 11/2014 | Moore et al. | H04L 63/1433 726/25 |
| 2015/0026027 A1* | 1/2015 | Priess | G06Q 40/00 705/35 |
| 2015/0065087 A1 | 3/2015 | Cudak et al. | |
| 2015/0074390 A1* | 3/2015 | Stoback | H04L 63/1483 713/156 |
| 2015/0106873 A1* | 4/2015 | Marsh | G06F 21/577 726/1 |
| 2015/0142700 A1* | 5/2015 | Best | G06N 5/04 706/11 |
| 2015/0195299 A1 | 7/2015 | Zoldi et al. | |
| 2015/0205954 A1 | 7/2015 | Jou et al. | |
| 2015/0215334 A1 | 7/2015 | Bingham et al. | |
| 2015/0237062 A1* | 8/2015 | Roytman | H04L 63/1433 726/25 |
| 2015/0237065 A1* | 8/2015 | Roytman | H04L 63/1433 726/25 |
| 2015/0261859 A1* | 9/2015 | Isensee | G06F 16/287 707/723 |
| 2015/0271119 A1* | 9/2015 | Goncalves | H04L 51/16 709/206 |
| 2015/0324909 A1* | 11/2015 | deoliveira | G06Q 40/02 705/38 |
| 2015/0339446 A1* | 11/2015 | Sperling | G06F 19/328 705/3 |
| 2016/0050224 A1* | 2/2016 | Ricafort | H04L 61/2007 726/23 |
| 2016/0065594 A1 | 3/2016 | Srivastava et al. | |
| 2016/0078229 A1* | 3/2016 | Gong | G06F 21/577 726/24 |
| 2016/0080408 A1* | 3/2016 | Coleman | H04L 63/1433 726/22 |
| 2016/0212165 A1* | 7/2016 | Singla | G06F 21/577 |
| 2016/0217282 A1* | 7/2016 | Vecera | G06F 21/565 |
| 2016/0224724 A1* | 8/2016 | Zhao | C12Q 1/6869 |
| 2016/0232465 A1* | 8/2016 | Kurtz | G06Q 40/08 |
| 2016/0330228 A1* | 11/2016 | Knapp | H04L 63/1433 |
| 2016/0378932 A1* | 12/2016 | Sperling | G06F 19/328 705/3 |
| 2017/0046519 A1* | 2/2017 | Cam | G06F 21/577 |
| 2017/0230247 A1* | 8/2017 | Hillier | H04L 41/0896 |
| 2017/0244740 A1* | 8/2017 | Mahabir | H04L 63/1433 |
| 2017/0310546 A1* | 10/2017 | Nair | H04L 41/22 |
| 2017/0346824 A1* | 11/2017 | Mahabir | H04L 63/10 |
| 2018/0124114 A1* | 5/2018 | Woods | H04L 63/20 |

OTHER PUBLICATIONS

Jared Holsopple, Shanchieh Jay Yang, Moises Sudit, "TANDI: threat assessment of network data and information," Proc. SPIE 6242, Multisensor, Multisource Information Fusion: Architectures, Algorithms, and Applications 2006, 62420O (Apr. 18, 2006); doi: 10.1117/12.665288.*

Office Action for U.S. Appl. No. 14/339,441, dated Dec. 26, 2014.
Office Action for U.S. Appl. No. 14/833,975, dated Mar. 18, 2016.
Office Action for U.S. Appl. No. 14/833,975, dated Jul. 1, 2016.

* cited by examiner

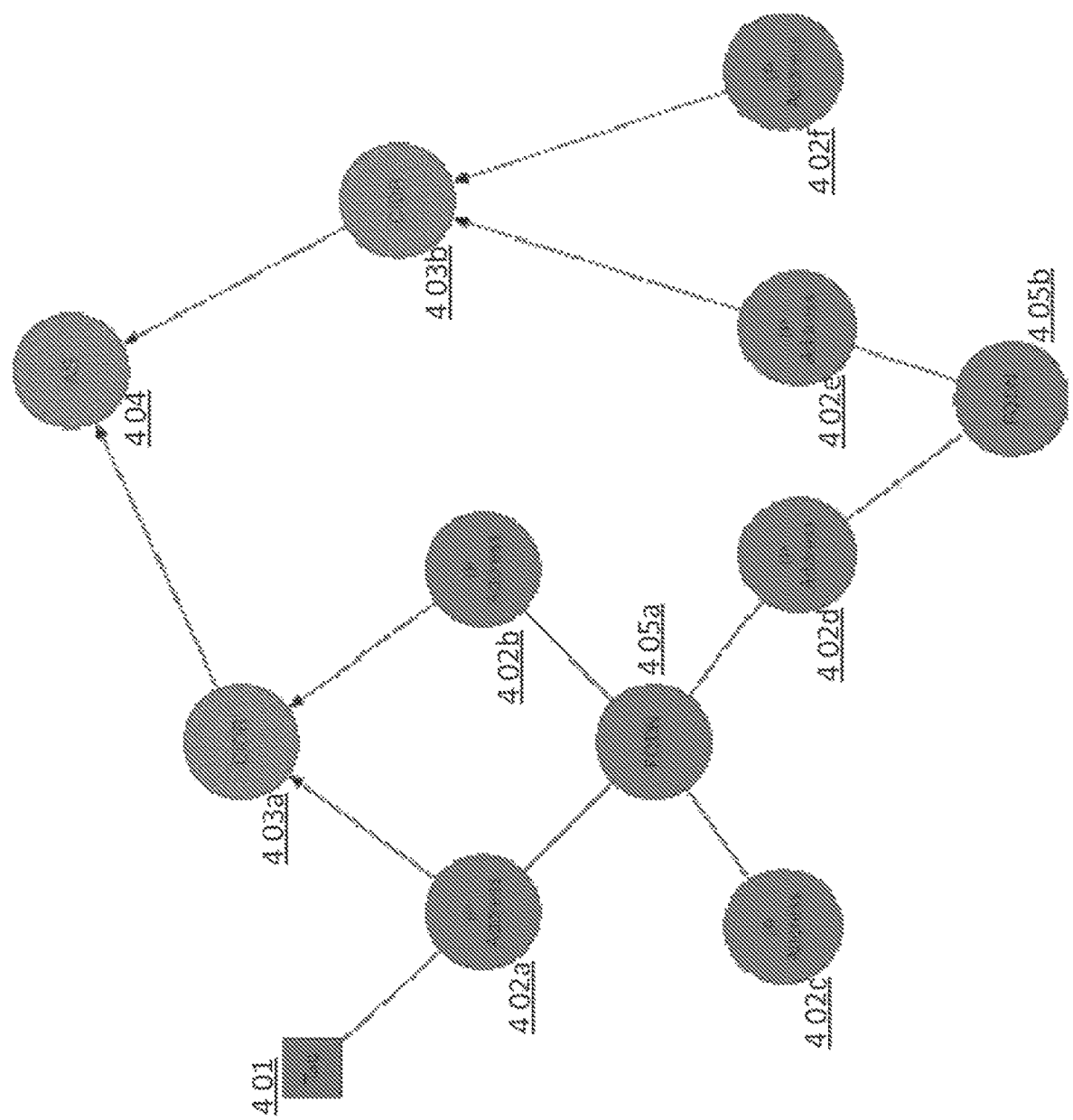

APPARATUSES, METHODS AND SYSTEMS FOR A CYBER THREAT CONFIDENCE RATING VISUALIZATION AND EDITING USER INTERFACE

CROSS-REFERENCE TO RELATED PATENT APPLICATIONS

This patent application is a Continuation of and claims priority to and the benefit of U.S. Patent application Ser. No. 14/833,975, entitled "APPARATUSES, METHODS AND SYSTEMS FOR A CYBER THREAT CONFIDENCE RATING VISUALIZATION AND EDITING USER INTERFACE," and filed Aug. 24, 2015, which in turn is a Continuation of and claims priority to and the benefit of U.S. patent application Ser. No. 14/339,441, entitled "APPARATUSES, METHODS AND SYSTEMS FOR A CYBER THREAT CONFIDENCE RATING VISUALIZATION AND EDITING USER INTERFACE," and filed Jul. 23, 2014. The entire contents of the aforementioned applications are herein incorporated by reference in their entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Some embodiments generally relate to apparatuses, methods, and systems for cyber security management, and more particularly, relate to a cyber threat confidence rating visualization and editing user interface ("TIC").

BACKGROUND

Computer malware is a type of software that disrupts the normal operation of a computer. A malware instance can send malicious code programs to a computer so as to burden the processing capacity of the computer, gain access to secured data without authorization, or modify critical system settings. Anti-malware programs are designed to detect potential threats of malware.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

FIG. 4 provides a network infrastructure diagram illustrating propagating a threat indicator tag through a network, according to one embodiment of the TIC.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

In one embodiment, the TIC may instantiate a user interactive risk evaluation component having a user interface input element for a user to submit calculation weights for one or more characteristics of a cyber threat; generate a graphical representation of a cyber threat confidence score for user interface display via the user interactive risk evaluation component; and dynamically adjust the graphical representation of the threat confidence score using at least one of the one or more characteristics weighted by the user configured weight.

DETAILED DESCRIPTION

The cyber threat intelligence confidence rating visualization and editing user interface technology (hereinafter "TIC") provides a user interface that allows a user (e.g., a cyber threat analyst, etc.) to submit ratings for various characteristics associated with a cyber threat indicator.

For example, threat indicators are associated with one or more internet hosts indicating that host has some form of risk associated with it (e.g., a risk assessment score, or a threat indicator confidence score may be either positive or negative with respect to the risk associated with a network, etc.); an individual indicator can be provided by one data source and characterized by that data source in terms of severity of the risk associated with the threat indicator and categories of the risk associated with the threat indicator. Such data sources may be a threat monitoring source, a target host, and/or the like. The TIC can use a combination of the data source(s), threat indicator classification(s) and severity of the threat indicator into an overall risk score representing a confidence level of the received threat indicator. In another example, a threat indicator confidence score (TIC score) can be the result of a single threat indicator, or a score on a network element where the score is the combined score of all of the threat indicator TIC scores associated with the network element.

In some embodiments, those threat indicators and their associated risk score may not be accurate and a cyber analyst may modify the threat indicator's risk score, e.g., by manually adjust a rating, a weight parameter, etc. of the risk score based on the cyber analyst's experience. The TIC provides an intuitive UI for allowing the cyber analyst to modify and edit the risk score characteristic ratings and weights.

Figure 1A:
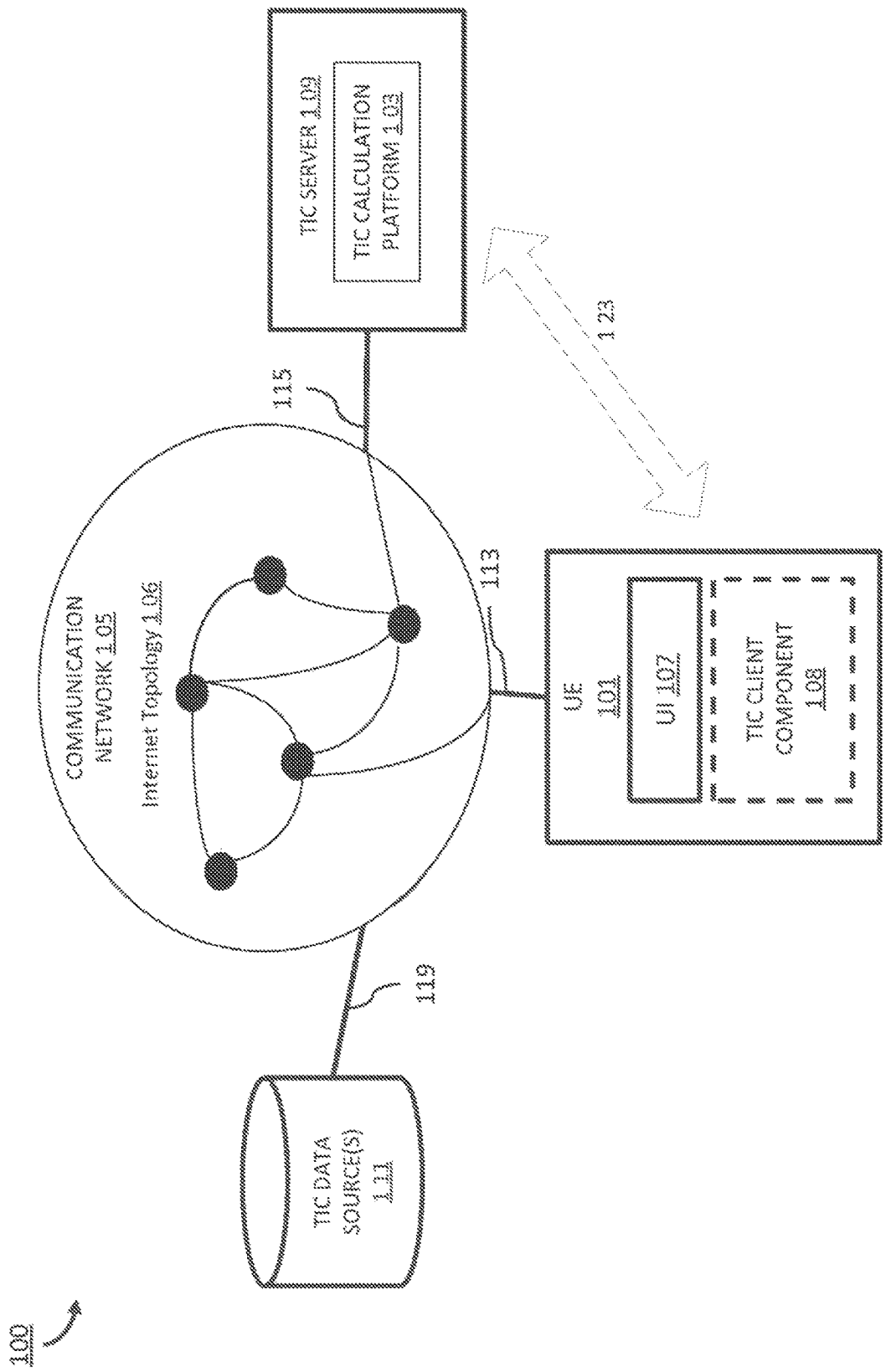
FIG. 1A provides a schematic block diagram of a communication network system in which TIC aspects can be provided, according to an embodiment.

FIG. 1A provides a schematic block diagram of a communication network system in which TIC aspects can be provided, according to an embodiment. A communication network system 100 can include one or more user devices or user equipments (UEs) lot, each equipped with at least a user interface (UI) 107; one or more TIC servers 109 including a TIC calculation platform 103; one or more data source(s) 111, which are connected via a communication network 105 (that may include Internet topology information 106, etc.). Any of the devices or platforms of the communication network system 100 can be equipped with local memory/ storage spaces (not shown in FIG. A). Furthermore, the devices and platforms of the network system 100 may have access to centralized or distributed memory/storage spaces (not shown in FIG. 1A) through the communication network 105. Thus, FIG. 1A is merely an example illustrating the types of devices and platforms that can be included within a communication network system 100.

Communication network 105 can be any communication network, such as the Internet, configurable to allow the one or more UEs lot, the one or more TIC servers 109, and the TIC data sources 111 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the TIC data source(s) 111 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1A, UEs lot are operatively coupled to communication network 105 via network connection(s) 113; TIC servers 109 are operatively coupled to communication network 105 via network connection(s) 115; and data source(s) 111 are operatively coupled to communication network 105 via network connection(s) 119. Network connections 113, 115, and 119 can be any appropriate network connection to operatively couple UEs lot, the TIC servers 109, and the data source(s) 111. Furthermore, the TIC server 109 can have a direct connection with the UEs 101 via a communication 123.

A network connection can be a wireless network connection such as, for example, a wireless fidelity ("Wi-Fi®") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one TIC server 109, and more than one data source 111. A UE 100, and/or a TIC server 109, each of which can be operatively coupled to the communication network 105 for example by heterogeneous network connections. For example, a first UE 100 can be operatively coupled to the communication network 105 by a WWAN network connection, another UE lot can be operatively coupled to the communication network 105 by a DSL network connection, and a TIC server 109 can be operatively coupled to the communication network 105 by a fiber-optic network connection.

The TIC server(s) 109 each can be, for example, a web server configured to provide search capabilities to electronic devices, such as UEs lot. The UE 100 can be in communication with the TIC server(s) 109 via the communication network 105, while the communication is managed by the TIC client component 108. In one implementation, the TIC server(s) 109 can be a remote server housed separately from the UE 100, where the TIC client component 108 can include an application (e.g., a browser application, a mobile application, etc.) instantiated on a user device (e.g., a Smartphone, a computer, a workstation, a personal digital assistant, etc.). For example, the TIC client component 18 can send a signal representing a control command (e.g., user submitted parameters, etc.) to the TIC server(s) 109 for TIC score calculation (which can be performed by the TIC calculation platform 103), where the results of the calculation may be presented via the UE 100. In another example, the TIC calculation platform 103 at a TIC server 109 can calculate a TIC score on the global internet topology 106 of the communication network 105, and a TIC client component 108 at the UI 101 can receive the TIC score via the communication network 105. In another implementation, the TIC server(s) 109 may be integrated with the UE lot including the TIC client component 108. For example, the TIC server 109 and UE 101 may act as an integrated computing device operated by a user, and communicate with various entities such as a user, data source, and/or the like, for cyber threat analytics. A detailed discussion of functional module(s) and data store(s) of the TIC server 109 (e.g., when integrated with a UE 101) is provided in FIG. 2A.

The UEs 101 can be any of a variety of electronic devices that can be operatively coupled to communication network 105. A UE 101 can be, for example, a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be, for example, a television set, a streamer device, a set top box, or any other electronic device equipped with a display unit (a UI 107) and a network connection 113 that enables the device to run applications with real-time contents received via the network connection 113 on an operating system. The UEs 101 each can include a web browser configured to access a webpage or website, for example, the TIC client component 108, which can be accessible over communication network 105. The UEs 101 can be configured to support, for example, Hyper Text Markup Language (HTML) using JavaScript. For example, the UEs lot can include a web browser, such as, Firefox®, Safari®, Dolphin®, Opera®, Internet Explorer (IE)®, Chrome® and/or similar browsers. An Internet page or website can be accessed by a user of a web browser at a UE lot by providing the web browser with a reference such as a uniform resource locator (URL), for example, of a webpage. For example, a user of a UE 101 can access a TIC server 109 via a URL designated for the TIC server 109. In some instances, UEs 101 each can include specialized software other than a browser for accessing a web server such as, for example, a TIC server 109. Specialized software can be, for example, a specialized network-enabled application or program. In some instances, portions of a website accessible via a web server can be located in a local or remote memory space/data store accessible to the web server. A UE 101 can also include a display, monitor or user interface (UI) 107, a keyboard, various ports (e.g., a USB port), and other user interface features, such as, for example, touch screen controls, audio components, and/or video components (each not shown).

Data source(s) 111 can be distributed sources of data throughout the communication network system 100. A data source 111 can be one or more of a database, a data warehouse, a file, etc.

Figure 1B:
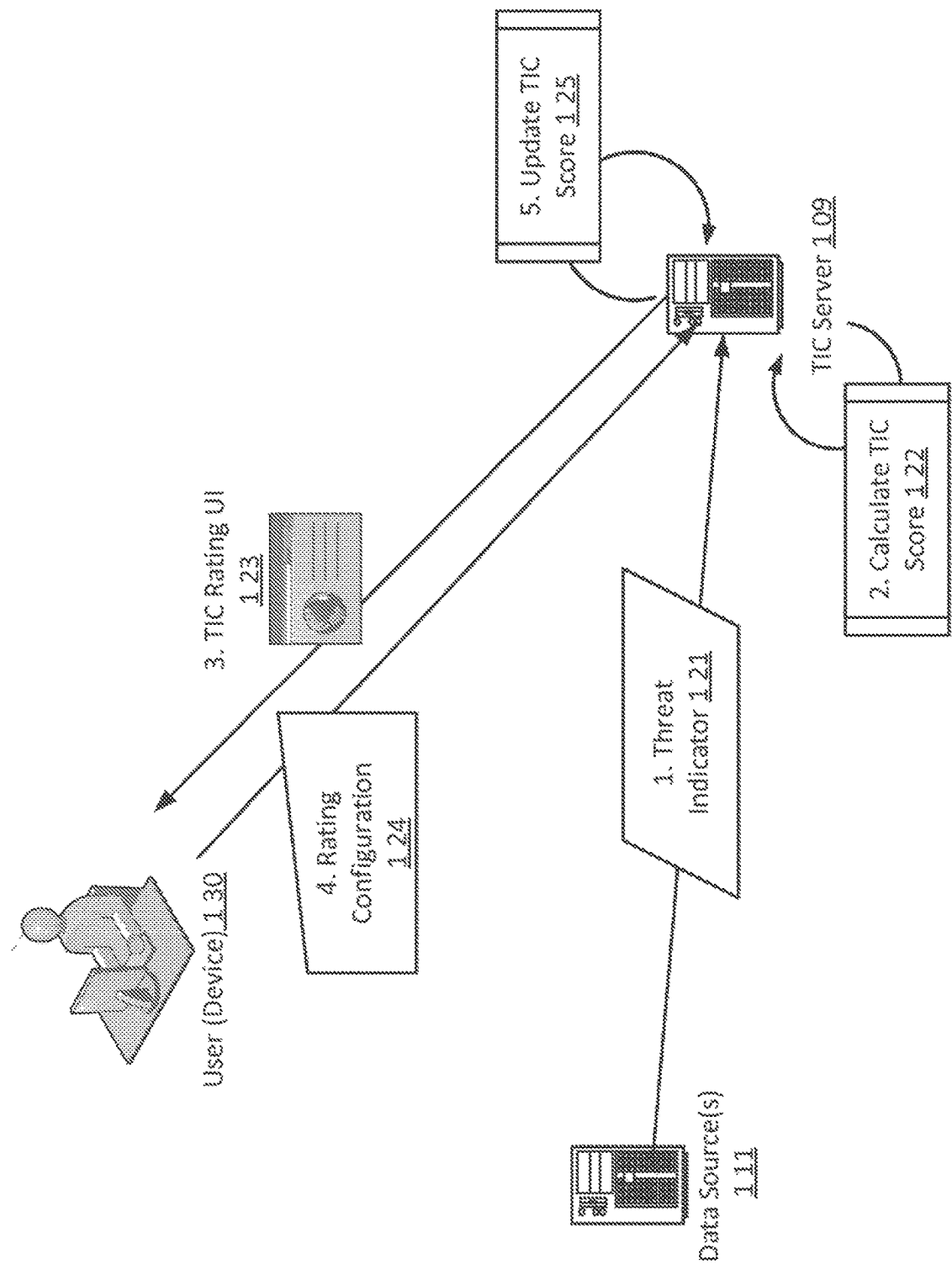
FIG. 1B provides a block diagram illustrating aspects of providing a threat indicator confidence score rating user interface (UI) to a user, according to one embodiment of the TIC.

FIG. 1B provides a block diagram illustrating aspects of data flows between the TIC server (e.g., 109 in FIG. 1A) and related entities, according to one embodiment of the TIC. In one embodiment, the TIC server 109 may receive a threat indicator 121 from a data source (e.g., a threat monitor source, a host target, etc.) 111, and/or a cyber threat analytics source, and/or the like. The threat indicator 121 may identify a potential cyber threat to a target host, and may include characteristics of the identified cyber threat and a rating associated with characteristics and/or parameters of the threat indicator. Example threat indicator characteristics/parameters include, but not limited to a criticality rating of the threat indicator, a classification of the threat indicator, source information of the threat indicator, and/or the like. An example data structure of the threat indicator 121 is provided, for example, at 205 in FIG. 2B.

Returning to FIG. 1B, the TIC server 109 can then calculate a TIC score 122, which indicates a confidence level with regard to the threat indicator 121. Further details of calculating a threat indicator confidence score are provided in FIGS. 2C-2D and 4.

Upon obtaining a threat indicator confidence score, the TIC server 109 may generate and provide a cyber threat confidence rating visualization and editing user interface 123 to a user (operating a user device) 130o. In one implementation, the user/user device 130 may submit a rating configuration 124 via the TIC rating UI 123 to the TIC server 109. Example TIC rating UIs and user interactions are further provided in FIGS. 3A-3C.

The TIC server 109 may update the TIC score based on the submitted rating configuration 124, e.g., at 125 following similar procedures as calculating a TIC score at 122. Further discussion of the TIC asset scores are provided in FIGS. 2C-2D.

Figure 2A:
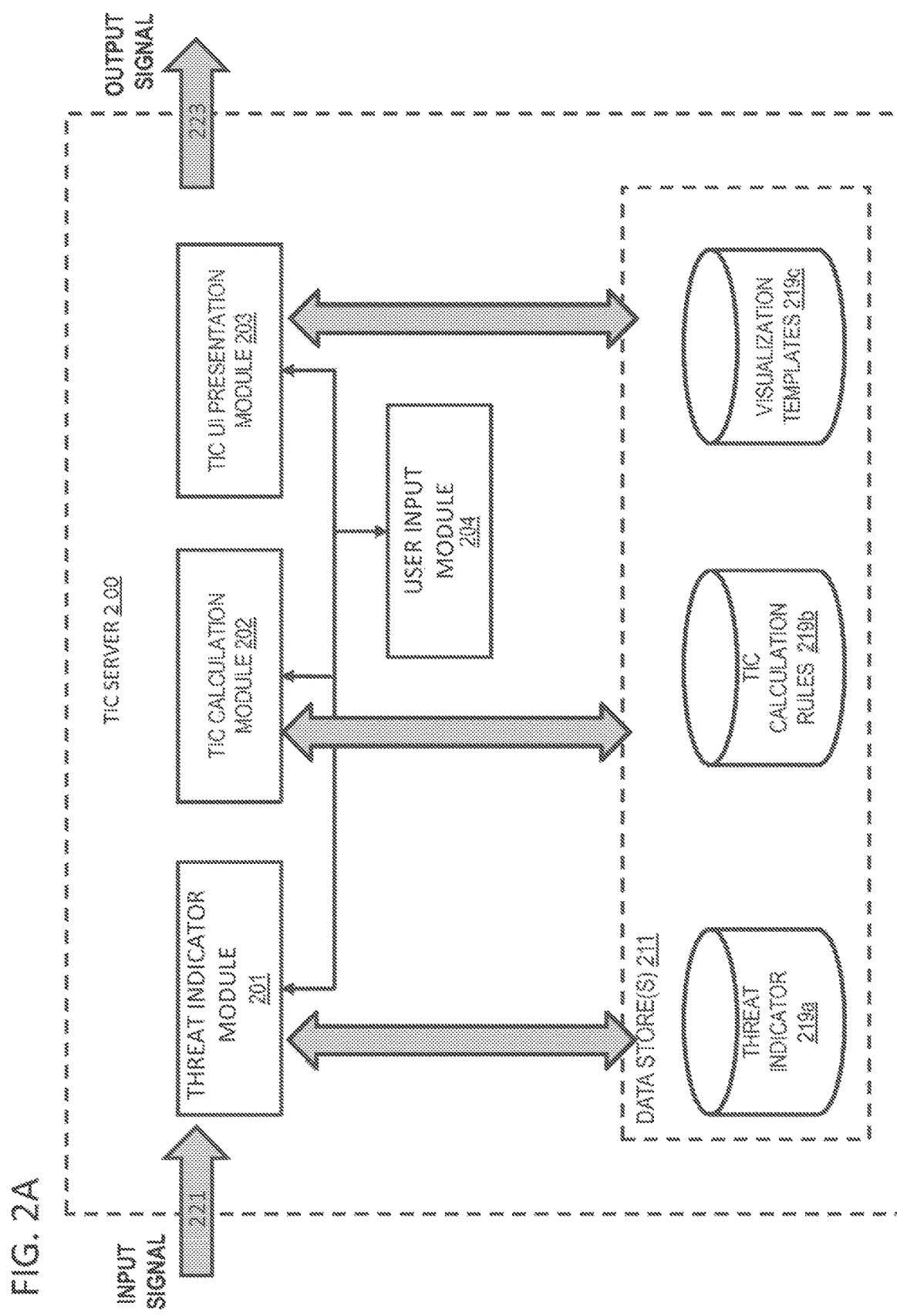
FIG. 2A is a schematic illustration of TIC components and/or modules, according to an embodiment.

FIG. 2A is a schematic illustration of TIC components and/or modules of a TIC server (e.g., 109 in FIG. 1A), according to an embodiment. The TIC server 200 can be similar to the TIC server 109 of FIGS. 1A-B. As shown in FIG. 2A, a TIC server 200 can include a threat indicator module 201, a TIC calculation module 202, a TIC UI presentation module 203, a user input processing module 204, and/or the like. A data store(s) 211 can include a threat indicator table 219a, TIC calculation rules 219b, visualization templates 219c, and/or the like. Furthermore, the TIC server 200 communicates with other devices of a communication network system (e.g., communication network system 100 of FIG. 1A) via input signal 221 and output signal 223.

In various instances, the TIC server 200 and its components can be located anywhere within a communication network system 100 such as that shown in FIG. 1A. A including, but not limited to, within the UEs 101, or in separate locations within the communication network system 100 of FIG. 1A. The TIC server 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In some embodiments, the TIC server 200 can provide an analytics platform as a Software as a Service (SaaS) such that, for example, the TIC services are centrally hosted on the information cloud (not shown) for independent software vendors, system integrators, analytics consultants, enterprises, etc., to build multi-tenant business intelligence and embedded analytics solutions for external and internal customers and/or users, for example, by using a browser. The TIC server 200 can enable users to mashup data from various sources for real-time ad-hoc analysis, build reports with rich visualizations and dynamic dashboards, and collaborate in-place among stakeholders to make informed decisions. The TIC server 200 can provide capability of reducing data into smaller parts or views that can yield more information (e.g., slice and dice), drill downs and search on data. For example, a multi-dimensional data structure can be considered as a data cube and the act of picking a rectangular subset of a data cube by choosing a single value for one of its dimensions can define a new data cube with one fewer dimension (e.g., slice operation). Other operations can produce sub-cubes, for example, by allowing an analyst to pick specific values of multiple dimensions (e.g., dice operation). Furthermore, a drill down/up operation allows the user to navigate among levels of data ranging from the most summarized (up) to the most detailed (down).

In some instances, the TIC server 200 receives an input via the input signal 221 representing a question entered by a user of a UE 101 (as shown in FIG. 1A). The UE 101 in FIG. 1A, for example, can be equipped with input device(s) and a user can enter input signals representing threat indicator visualization settings, parameters, and/or the like, which can be processed by the user input module 204. In such instances, the TIC calculation module 202 can calculate or dynamically update a TIC score based on TIC calculation rules 219b in the data store 211.

The TIC UI presentation module 203 can in turn update the TIC visualization presentation via the user interface based on the updated TIC score, and visualization templates 219c. In another example, the input signal 221 may include a threat indicator sent from a data source (e.g., see 111 in FIGS. 1A-B, etc.), and the threat indicator input signal 221 may be processed at the threat indicator module 201; and the threat indicator can be stored at a threat indicator table 219a (example data structure of a threat indicator is provided at 205 in FIG. 2B and described below).

In various instances, the output signal 223 may include a variety of data outputs, such as a generated TIC score, information for a visual presentation (e.g., data plots, charts, etc.) of the TIC score, and/or the like. Example TIC score visualization are provided in FIGS. 3A-3C and discussed in further detail below.

Figure 2B:
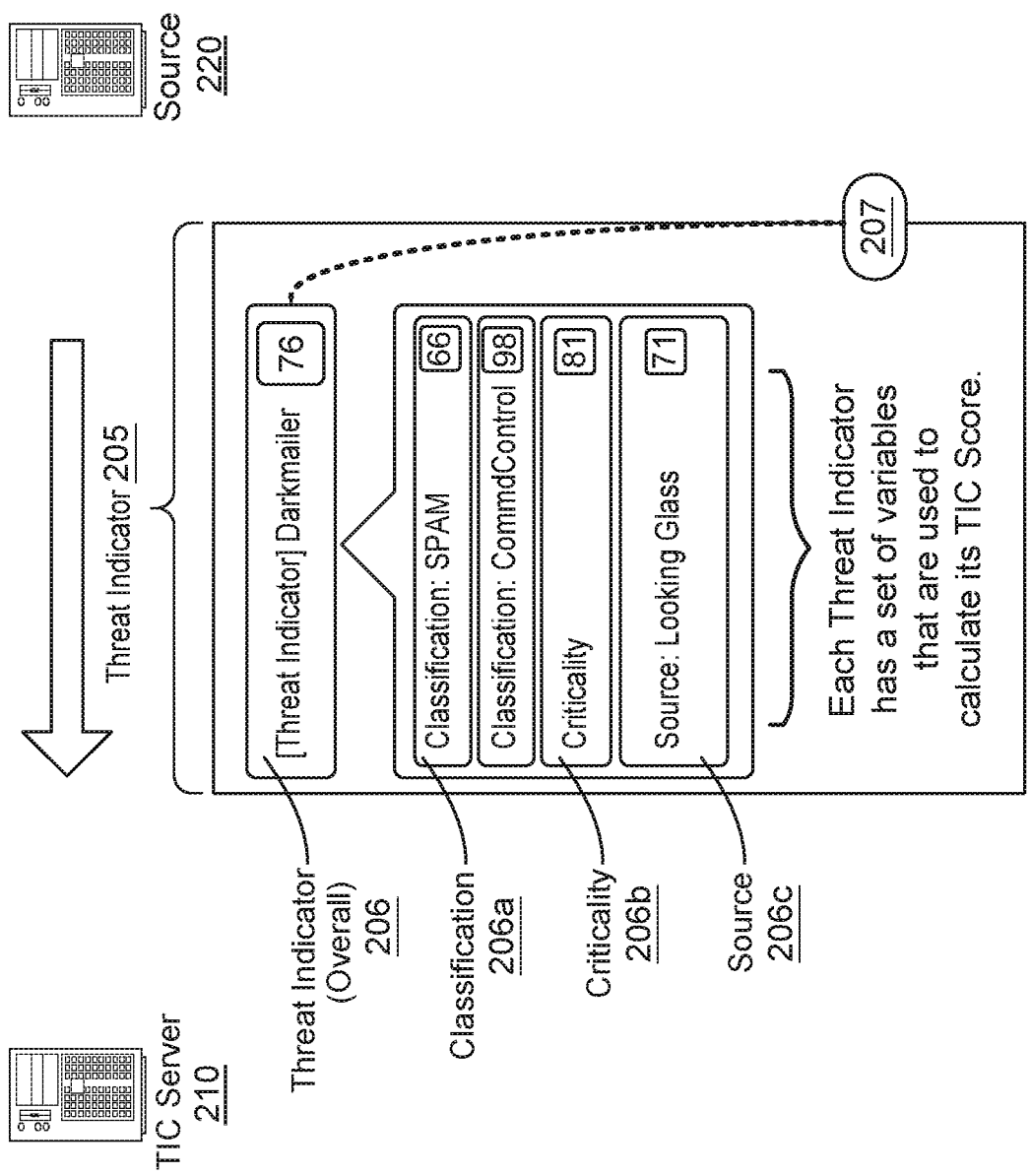
FIGS. 2B-2D provide diagrams illustrating data structure of calculating a threat indicator confidence score, according to one embodiment of the TIC.

FIG. 2B provides a diagram illustrating an example data structure of a threat indicator, as received at the threat indicator module 201 in FIG. 2A, according to an embodiment. As shown in FIG. 2B, the TIC server 210 may receive a threat indicator 205 from the source 220. The threat indicator 205 may include an overall threat indicator 206, e.g., "Darkmailer" associated with an overall risk score.

In one implementation, a TIC score is calculated as a rating of the severity of a threat indicator (e.g., 205). Such a TIC score can be calculated as associated with an independent threat incident, and/or associated with a network because the threat incident can promulgate through the elements of the network. A network element or set of network elements can have an associated TIC score, which represents how threatening the particular element, or set of elements is. A network element or set of network elements that has a TIC score is defined as a TIC asset. The network elements can be, for example, an individual element described by a specific IP address. A set of network elements can include, for example, Classless Inter-Domain Routing (CIDR), IP Range or collection of network domains, Fully Qualified Domain Names (FQDNs), and/or the like.

For example, the TIC calculation module (e.g., see 202 in FIG. 2A) can receive a threat indicator tag, which can include, for example, any of the four factors (1) the rating of the source feed; (2) the classification rating of the threat indicator tag; (3) the criticality of the threat indicator tag; and (4) the time since the threat indicator tag was created or last updated. Each of the first three parameters (1)-(3) ranges from 0 to 1. For example, the threat indicator tag score could be calculated as one minus a product of the ratings (1)-(3). The TIC calculation module can send the threat indicator tag through a network of elements/assets, so that a TIC asset score can be calculated at each node in a web of network assets, e.g., as a sum of TIC tag scores of threat indicator tags that pass through the node, etc. Further implementations of calculating a TIC asset score are discussed in FIG. 4.

The overall threat indicator score 206 can be built upon a data structure of an object model, including characteristics and/or parameters such as Classification 206a, Criticality 206b, and Source 206c. A pseudo code example data structure of the threat indicator object model may take a form similar to:

```
Class {Indicator}
    name/string as a key
    one or more Classifications;
    one Source;
    a riskScore that is the numerical combination of Criticality,
Classification Rating and Source Rating
    a numerical Criticality (e.g., 1 to 100; 100 being most critical)
    ...
Class {Classification}
    a name/string as a key
    a numerical Rating (1 to 100)
        associated with one or more Indicators
    ...
Class {Source}
    a name/string as a key
    a numerical Rating (1 to 100)
        contains 1 or more Indicators
    ...
```

Figure 2C:
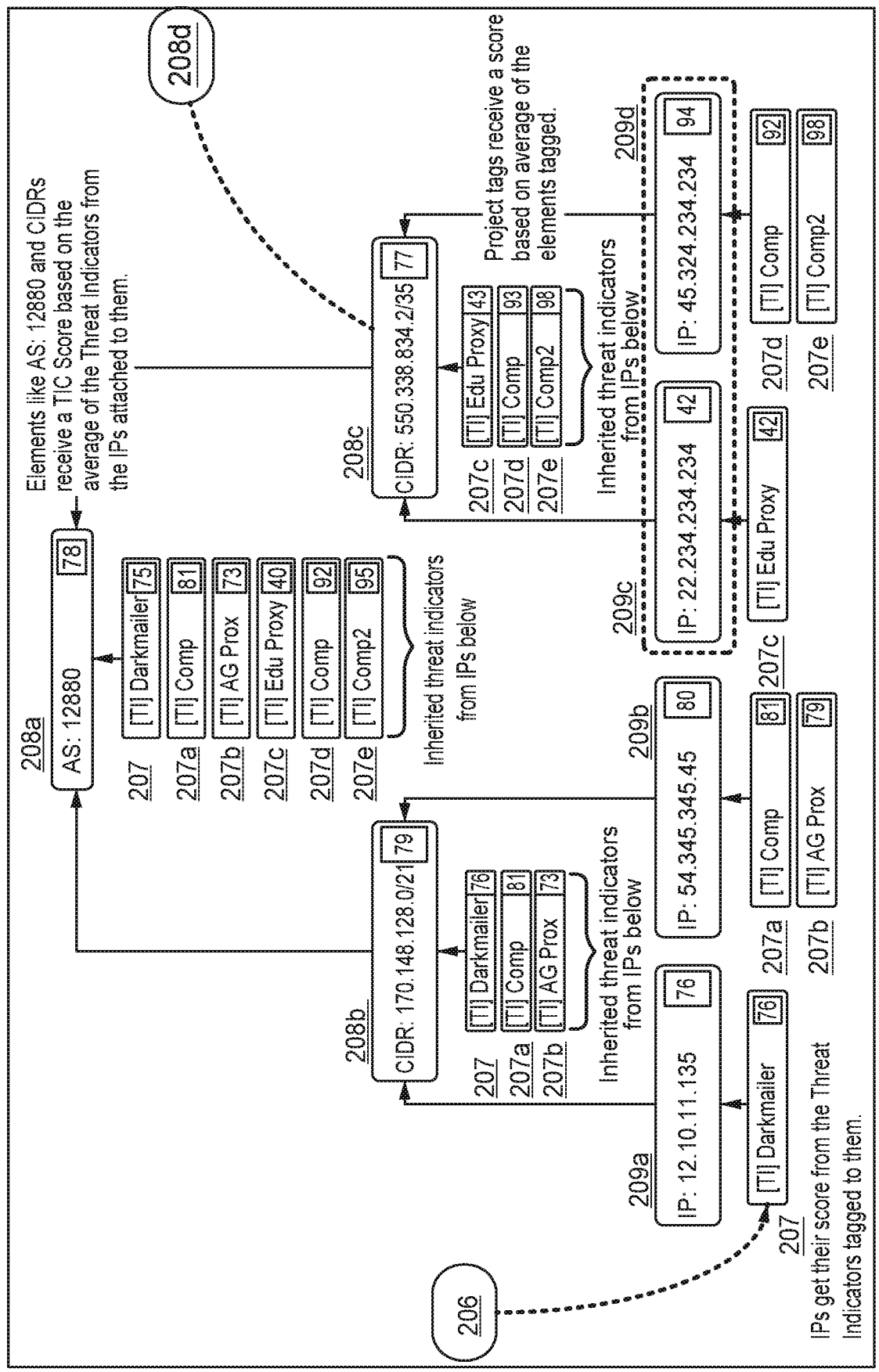
Figure 2D:
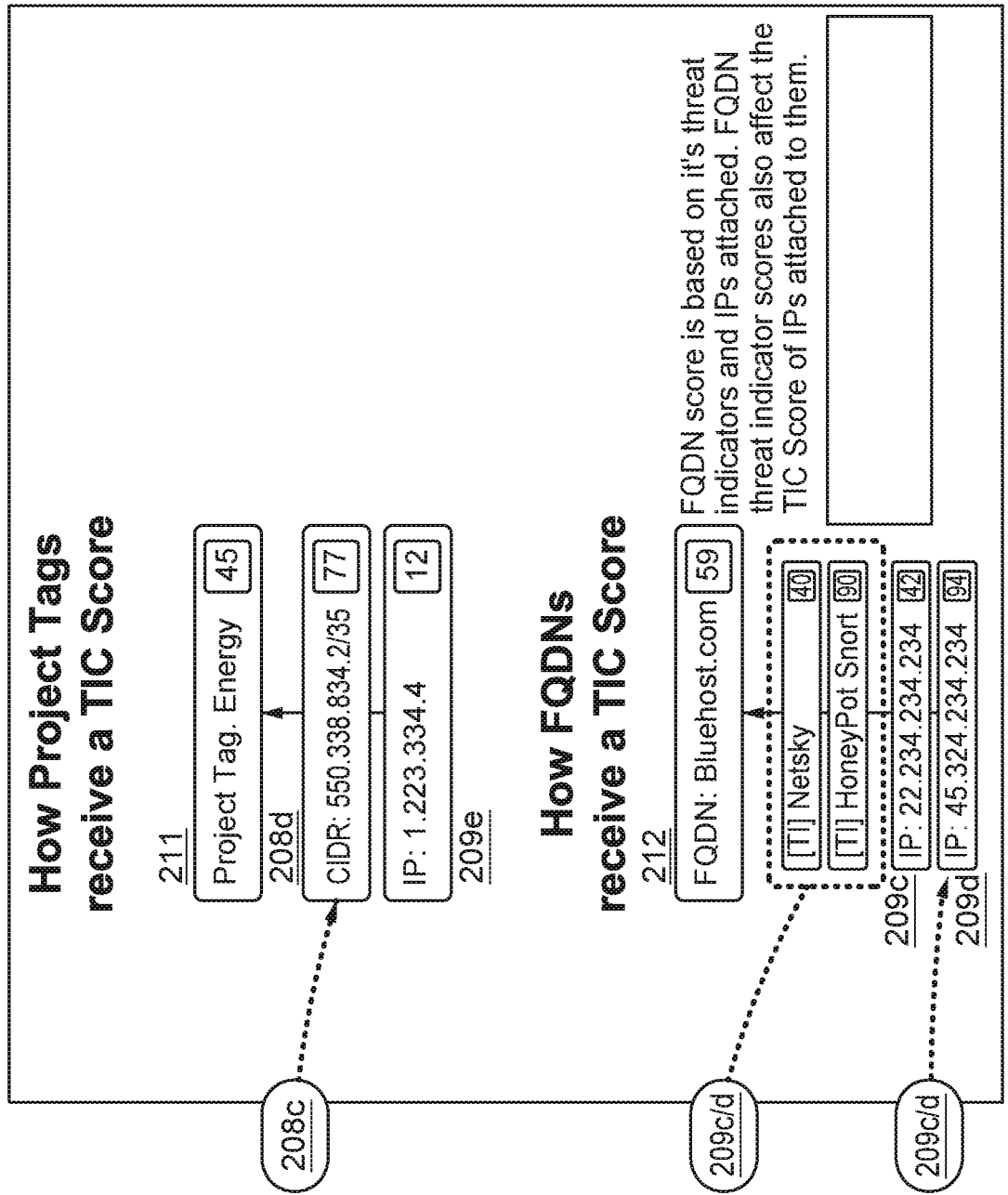

FIGS. 2C-2D provide an example network infrastructure illustrating calculation of a threat indicator confidence score at the TIC calculation module 202 in FIG. 2A according to one embodiment.

For example, as shown at FIGS. 2C-2D, continuing on at 207, the IP addresses 209a-d can be assigned a TIC score from the threat indicator (e.g., 207) tagged to the respective IP addresses 209a-d. The threat indicator (e.g., 207) including the parameters in the threat indicator can be inherited by CIDR 208b-c from IP addresses 209a-d. For instance, the CIDR 208b can inherit the threat indicator parameters 207a-b from IP address 209b; the CIDR 208c can inherit the threat indicator parameters 207c-e from IP addresses 209c-d. The network element such as an automatic system (AS) 208a can in turn inherit all threat indicator characteristics and/or parameters 207a-e from the CIDRs 208b-c, and receive a TIC score based on the average of the threat indicators from the IPs (e.g., traced back to 209a-d) attached to the indicator.

Continuing on with FIG. 2D, FQDNs 212 can further inherit the TIC scores based on the threat indicator (e.g., 207 in FIG. 2C) and the IP addresses (e.g., traced back to IP addresses 209c-d in FIG. 2C, and also shown in FIG. 2D). A project tag 211 may receive a TIC score based on the CIDR 208d and/or the IP address 209e attached.

Figure 3A:
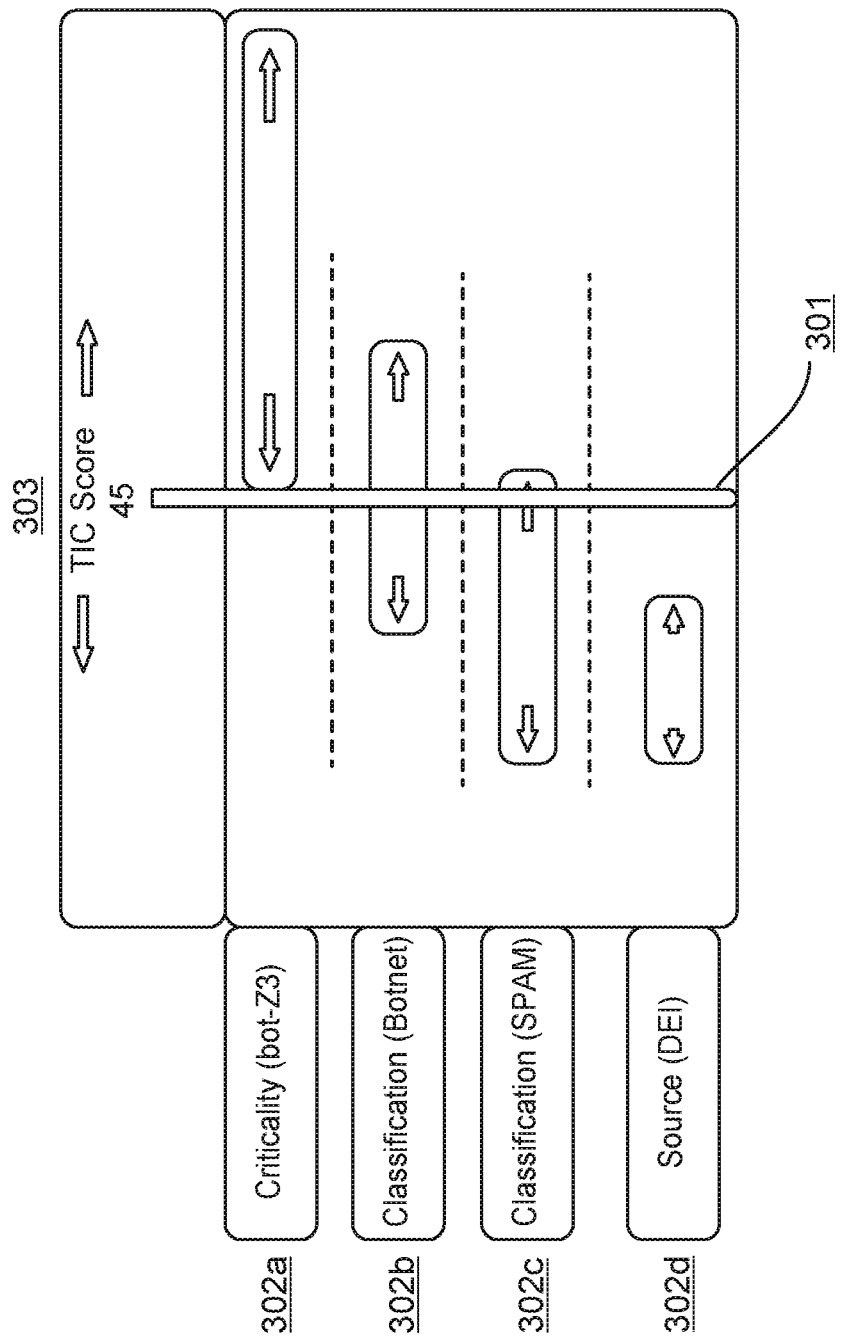
FIGS. 3A-3C provide example UI screens illustrating aspects of an interactive threat indicator confidence score rating editor, according to one embodiment of the TIC.
Figure 3B:
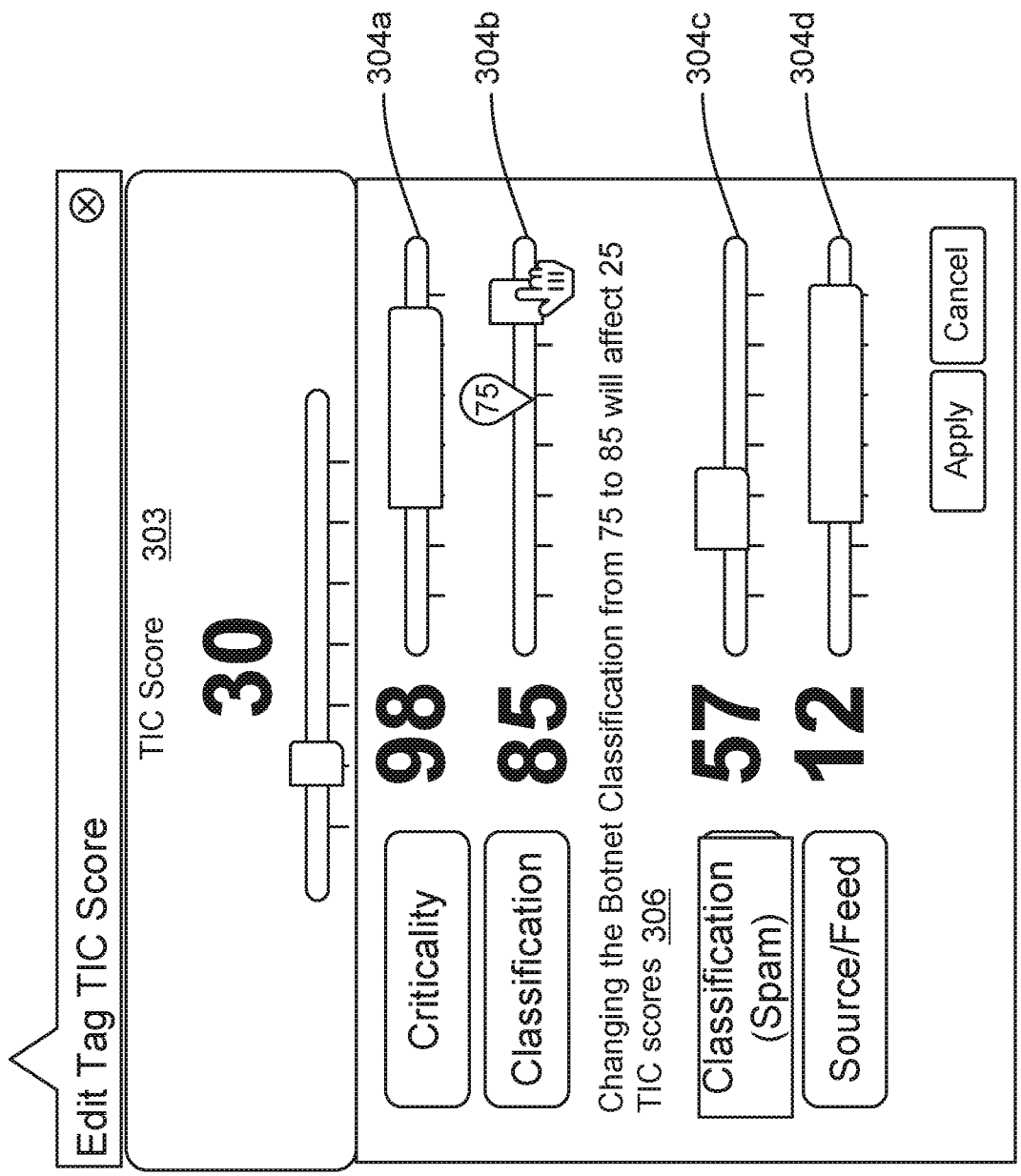
Figure 3C:
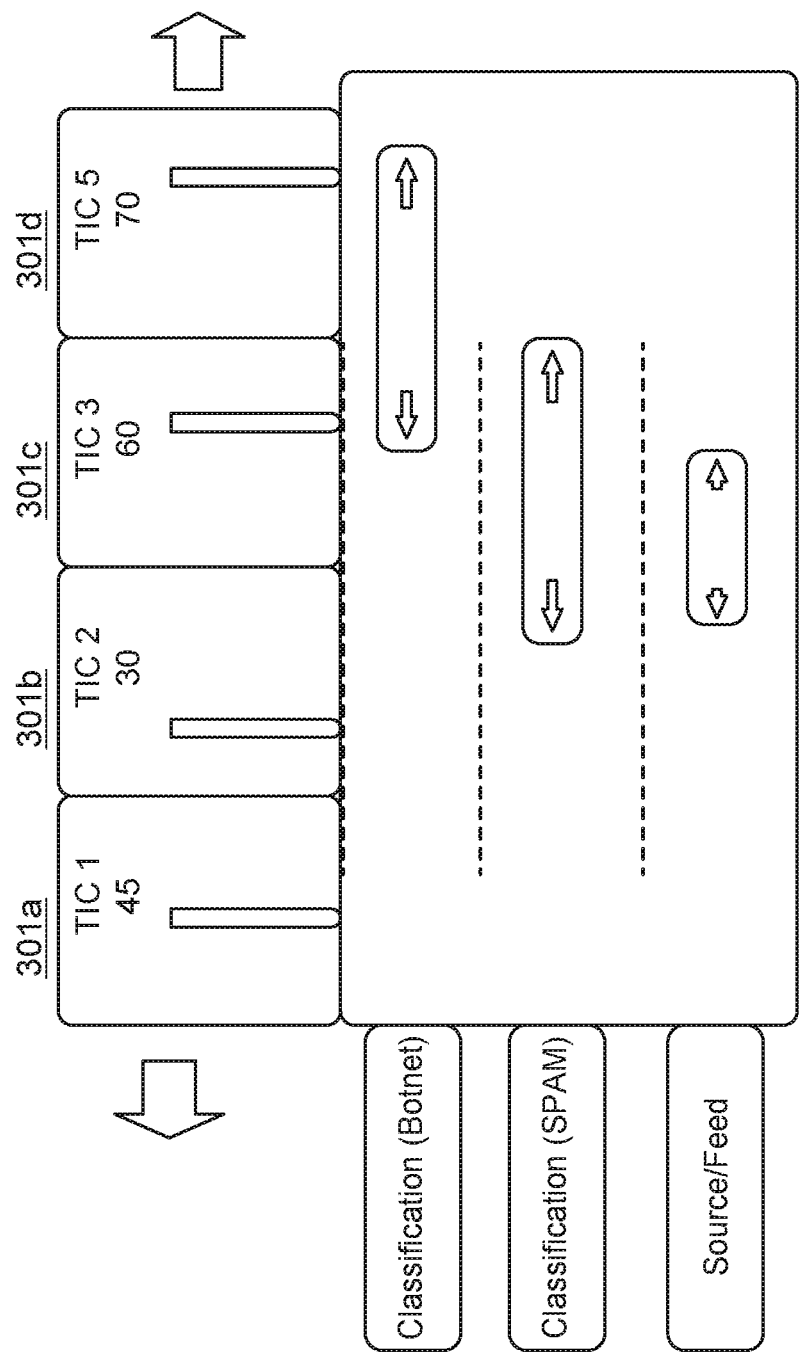

FIGS. 3A-3C provide example UI screens illustrating aspects of an interactive threat indicator confidence score rating editor, as generated by the TIC UI presentation module 203 at FIG. 2A, according to one embodiment. In one embodiment, the TIC platform (e.g., 103 in FIG. 1A; 200 in FIG. 2A, etc.) may provide a TIC editor including a graphical interface widget that allows a user to configure ratings of classification, source and criticality associated with a threat indicator and observe the impact of each parameter impacts other indicators associated with that source and/or classification. The UI diagrams shown in FIGS. 3A-3C may be presented at a UE (e.g., see lot in FIG. 1A).

In one implementation, the TIC editor shows a TIC score (or a risk score) 303 and its relationship to classification/source information, such as, but not limited to criticality 302a, classification of source 302b, classification of threat 302c, source 302d, and/or the like. As shown at 303 in FIG. 3A, the TIC Score 303 shows the overall score via a widget 301, which shows the overall score via a vertical line and across each of the sub-parameters 302a-d.

For each row in the UI, a threat indicator characteristic and/or parameter (e.g., Criticality 302a, Classification 302b-c, Source 302d) is shown and its current value represented by a slider bar that shows the "weight" (and/or user rating) of that parameter has on the TIC score or risk score 303. The position of the slider bar and its middle point shows the current value of that particular parameter. This UI shows the relationship of each parameter has on the final risk score of the indicator.

For example, a user can click on the left and right arrows next to the TIC Score 303 as well as dragging the vertical bar 301 below the number to override all characteristic or parameters (e.g., 302a-d) influence on the TIC score 303. When the TIC score 303 has been adjusted by a user, the characteristic or parameter values (e.g., 302a-d) can be automatically re-arranged to match the changed TIC score. By doing so the user need not be knowledgeable about all characteristic or parameter values. In another example, the user can select a characteristic or parameter row (e.g., any of 302a-d), and move the sliding bar to submit a rating or weight value for the selected characteristic or parameter; and the TIC score 303 can in turn be re-calculated and dynamically updated based on the user submitted rating or weight value.

With reference to FIG. 3B, which provides an alternative view or equivalent of the UI of threat indicator editor, a user can move the slider bar 304 next to the Criticality row or drag the slider bar left or right to adjust the Criticality weight/rating. The TIC score 303 can automatically updates and the sliding bar indicating the TIC score would automatically adjusts in response to any changes to the sliding bars 304a made by the user.

In another example, the user can first click on the classification that they wish to modify, which can then lead to an additional set of TIC scores associated with that classification. In this way, the user can view all TIC scores that are associated with that classification and by modifying the classification rating value (via the sliding bar 304*b-c*) all of those TIC scores will be updated. For example, the UI may provide a notification that all associated TIC scores may be updated, e.g., at 306.

In another example, in a similar manner as modifying the classifications 302*b-c*, a user can modify the source information 304*d*, which may impact all TIC indicator scores from that source.

With reference to FIG. 3C, the TIC editor can show multiple threat indicator confidence scores, e.g., see 301*a*-301*b*, in one panel or screen. A user may click on each tab of the TIC scores 301*a-d*, and view the respective rows of parameters (Criticality, Classifications, Source) associated with the selected TIC score. In other words, the display of parameter/characteristic value changes as a different, corresponding TIC score is set by a user.

FIG. 4 provides a network infrastructure diagram illustrating sending a threat indicator tag through a network to calculate a TIC asset score, according to one embodiment. In one implementation, once a single TIC score(s) associated with a single threat indicator tag is calculated, the TIC score(s) are sent into a web of network assets via messages that start at the node attached to the threat indicator tag (e.g., 401). The web of network assets, as shown in FIG. 4, can include undirected transmission paths between FQDNs 405*a-b* and devices with IP addresses 402*a-f*, as well as directed transmission from devices with IP addresses 402*a-c* to CIDRs 403*a-b* and from CIDRs 403*a-b* to autonomous systems (AS) 404. Undirected edges such as the lines connecting 402*d* to 405*b*, 402*e* to 405*b*, and/or the like, can allow threat indicator tag influence to flow across a given edge, regardless which direction the influence is coming from; directed transmission edges can allow threat indicator tag influence to only flow in the direction of the arrows.

To avoid loopy influence by a threat indicator tag on network assets, the TIC calculation module can use Dijkstra's breadth first search to propagate the threat indicator tag information along the network shown in FIG. 4, which means that all the nodes one hop away from the node where the threat indicator tag was originally attached (e.g., 401) have the tag information sent to it. Then all the nodes two hops away from the node where the threat indicator tag was originally attached (e.g., 401) have the threat indicator tag information sent to them, and so on. This process continues until the significance of the threat indicator tag information decreases to a point where further propagation will no longer affect TIC scores.

As the threat indicator tag information propagates from one node to another, its message strength decreases. The message strength starts with value 1 at the initial node to which the threat indicator tag is attached (e.g., 401), and decreases as the threat indicator tag information propagates away from the node. At each step, a decrease term is multiplied to the strength (the term is <1).

When the threat indicator tag information is passed through a node, an additional decrease term is applied. This term is equal to 1/(the number of connected outbound nodes). If the node that accepts the threat indicator tag information has five connected nodes, and the incoming threat indicator tag information came from one of the connected nodes, then the threat indicator tag information needs to be passed out through the other 4 connected nodes. Each of these threat indicator tag information has ¼ strength after the transmission.

In one implementation, the TIC asset score at a node is calculated as the collection of attached threat indicator tag information according to the following formula (for FQDNs and IPs).

$$TIC = \prod_i (1 - \text{Tag}_i)^{Message\_Strength_i}$$

where CIDRs and AS may use the same formula for the same threat indicator tag information.

It is intended that the systems and methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Python, JavaScript, Perl, PHP, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory medium storing code representing a plurality of processor-executable instructions, the code comprising code to cause the processor to:
   display, concurrently: (1) a graphical representation of a plurality of characteristics of a potential cyber threat to at least one targeted system, the potential cyber threat being associated with a malicious source, and (2) a graphical representation of a first cyber threat confidence score for the potential cyber threat, the cyber threat confidence score being based at least in part on plurality of characteristics of the potential cyber threat;
   detect a user interaction with the graphical representation of the plurality of characteristics, the user interaction representing a user-specified adjustment for a characteristic from the plurality of characteristics of the potential cyber threat;
   modify a value of the characteristic based on the user-specified adjustment for the characteristic to produce a modified plurality of characteristics of the potential cyber threat;
   automatically update the cyber threat confidence score, in response to producing the modified plurality of characteristics of the potential cyber threat, to generate an updated cyber threat confidence score based at least in part on the modified plurality of characteristics of the potential cyber threat; and
   provide, to a user, a graphical representation of the modified plurality of characteristics of the potential cyber threat, and a graphical representation of the updated cyber threat confidence score.

2. The non-transitory medium of claim 1, wherein:
   the plurality of characteristics includes a weighting for each value from a set of values of the plurality of characteristics,
   the user-specified adjustment for the characteristic from the plurality of characteristics is a user-specified weighting for that characteristic, and
   the code to modify includes code to modify the value of the characteristic based on the user-specified weighting to change the weighting for that characteristic when the cyber threat confidence score is updated.

3. The non-transitory medium of claim 1, wherein:
   the plurality of characteristics includes a numerical value for each value from a set of values of the plurality of characteristics,
   the user-specified adjustment for the characteristic from the plurality of characteristics is a user-specified numerical value for that characteristic, and
   the code to modify includes code to modify the value of the characteristic based on the user-specified numerical value to change the numerical value for that characteristic when the cyber threat confidence score is updated.

4. The non-transitory medium of claim 1, wherein:
   the graphical representation of the plurality of characteristics includes a horizontally-oriented bar having a length corresponding to a magnitude associated with that characteristic,
   the user-specified adjustment for the characteristic being represented within the user interface by a user-specified modification to the length of the horizontally-oriented bar for that characteristic.

5. The non-transitory medium of claim 1, wherein:
   the graphical representation of the plurality of characteristics includes a horizontally-oriented bar having a middle point corresponding to a numerical value and a length corresponding to a weighting, and
   the user-specified adjustment for the characteristic is represented within the user interface by a user-specified modification to at least one of the middle point or the length of the horizontally-oriented bar for that characteristic.

6. The non-transitory medium of claim 1, wherein the characteristic associated with the user-specified adjustment is at least one of a criticality of the potential cyber threat, a classification of the potential cyber threat, or a source of the potential cyber threat.

7. The non-transitory medium of claim 1, wherein:
   the updated cyber threat confidence score is updated dynamically within the user interface in response to receiving the user-specified adjustment for the characteristic from the plurality of characteristics.

8. The non-transitory medium of claim 1, wherein the code further comprises code to cause the processor to generate a graphical representation of a further cyber threat confidence score separate from and with the graphical representation of the updated cyber threat confidence within the user interface,
   the further cyber threat confidence score being different from the updated cyber threat confidence score,
   the further cyber threat confidence score being based at least in part on a further plurality of characteristics different from the modified plurality of characteristics.

9. The non-transitory medium of claim 1, wherein the code further comprises code to cause the processor to:
   generate a graphical representation of a further cyber threat confidence score separate from and with the graphical representation of the updated cyber threat confidence score within the user interface, the further cyber threat confidence score being different from the updated cyber threat confidence score, the further cyber threat confidence score being based at least in part on a further plurality of characteristics different from the modified plurality of characteristics;
   receive, from the user via the user interface, a user selection of the graphical representation of the further cyber threat confidence score; and
   generate, via the user interface and in response to receiving the user selection, a graphical representation of the further plurality of characteristics, the graphical representation of the further plurality of characteristics separately representing each characteristic from the further plurality of characteristics and a value of that characteristic.

10. The non-transitory medium of claim 1, wherein the user-specified adjustment is associated with one of sliding or dragging at least a portion of the graphical representation of the first set of values.

11. The non-transitory medium of claim 1, the code further comprising code to cause the processor to generate a graphical representation of the updated cyber threat confidence score in response to the user-specified adjustment.

12. The non-transitory medium of claim 1, wherein a position of the graphical representation of the plurality of characteristics is associated with a current value of at least one characteristic from the plurality of characteristics.

13. A non-transitory medium storing code representing a plurality of processor-executable instructions, the code comprising code to cause the processor to:
   display, concurrently: (1) a graphical representation of a cyber threat confidence score, and (2) a graphical representation of a plurality of characteristics of a potential cyber threat to at least one targeted system, the cyber threat confidence score being based at least in part on the plurality of characteristics of the potential cyber threat;

detect a user interaction with the graphical representation of the cyber threat confidence score, the user representation representing a user-specified adjustment for the cyber threat confidence score;

define an updated cyber threat confidence score based on the user-specified adjustment for the cyber threat confidence score;

automatically update the plurality of characteristics of the potential cyber threat, to generate an updated plurality of characteristics of the potential cyber threat based at least in part on the updated cyber threat confidence score; and provide, to a user, a graphical representation of the updated plurality of characteristics of the cyber threat.

14. The non-transitory medium of claim 13, wherein the graphical representation of the updated plurality of characteristics of the potential cyber threat separately represents a value of each characteristic from the updated plurality of characteristics of the potential cyber threat.

15. The non-transitory medium of claim 13, wherein:
the graphical representation of the updated plurality of characteristics of the potential cyber threat separately represents a value of each characteristic from the updated plurality of characteristics, and
the plurality of characteristics is updated dynamically within the user interface in response to receiving the user-specified adjustment for the cyber threat confidence score.

16. The non-transitory medium of claim 13, wherein:
the code to cause the processor to provide includes code to cause the processor to generate (1) a first graphical representation of the updated cyber threat confidence score, and (2) a second graphical representation of the updated cyber threat confidence score,
the second graphical representation of the updated cyber threat confidence score being physically positioned within the user interface and across the graphical representation of the updated plurality of characteristics of the potential cyber threat.

17. The non-transitory medium of claim 13, wherein:
the code to cause the processor to provide includes code to cause the processor to generate (1) a first graphical representation of the updated cyber threat confidence score, and (3) a second graphical representation of the updated cyber threat confidence score,
the first graphical representation of the updated cyber threat confidence score being a numerical value,
the second graphical representation of the updated cyber threat confidence score being physically positioned within the user interface and across the graphical representation of the updated plurality of characteristics of the cyber threat, the second graphical representation of the updated cyber threat confidence score being user selectable to specify a user-specified adjustment.

18. The non-transitory medium of claim 13, wherein the code further comprises code to cause the processor to:
generate a graphical representation of a further cyber threat confidence score separate from and with the graphical representation of the updated cyber threat confidence within the user interface,
the further cyber threat confidence score being different from the updated cyber threat confidence score,
the further cyber threat confidence score being based at least in part on a further plurality of characteristics different from the updated plurality of characteristics of the cyber threat.

19. The non-transitory medium of claim 13, wherein the code further comprises code to cause the processor to:
generate a graphical representation of a further cyber threat confidence score separate from and with the graphical representation of the updated cyber threat confidence within the user interface, the further cyber threat confidence score being different from the updated cyber threat confidence score, the further cyber threat confidence score being based at least in part on a further plurality of characteristics different from the updated plurality of characteristics of the cyber threat;
receive, from the user via the user interface, a user selection of the graphical representation of the further cyber threat confidence score; and
provide, via the user interface and in response to receiving the user selection, a graphical representation of the further plurality of characteristics, the graphical representation of the further plurality of characteristics separately representing each characteristic from the further plurality of characteristics and a value of that characteristic.

20. A non-transitory medium storing code representing a plurality of processor-executable instructions, the code comprising code to cause the processor to:
display, concurrently and via a user interface: (1) a graphical representation of a cyber threat confidence score, (2) a graphical representation of a second cyber threat confidence score, and (3) a graphical representation of a first set of values of a plurality of characteristics of a potential cyber threat to at least one targeted system, the first set of values of the plurality characteristics being associated with the first cyber threat confidence score, the graphical representation separately representing the value of each characteristic from the first set of values of the plurality of characteristics, the first cyber threat confidence score being based at least in part on the first set of values of the plurality of characteristics of the potential cyber threat, the second cyber threat confidence score being based at least in part on a second set of values of the plurality of characteristics;
detect a user interaction with the graphical representation of the second cyber threat confidence score, the user interaction representing a user selection of the second cyber threat confidence score; and
generate, automatically and in response to receiving the user selection, a graphical representation of the second set of values of the plurality of characteristics and remove the graphical representation of the first set of values, the graphical representation of the second set of values separately representing each characteristic and the value of that characteristic from the second set of values.

21. The non-transitory medium of claim 20, wherein the code further comprises code to cause the processor to:
receive, from the user via the user interface and after the graphical representation of the second set of values of the plurality of characteristics is generated, a user-specified adjustment for a characteristic from the plurality of characteristics;

modify a value of the characteristic based on the user-specified adjustment for the characteristic to produce a third set of values of the plurality of characteristics of the potential cyber threat;

calculate a third cyber threat confidence score based at least in part on the third set of values of the plurality of characteristics of the potential cyber threat; and provide to the user an indication of the third cyber threat confidence score.

22. The non-transitory medium of claim 20, wherein the code further comprises code to cause the processor to:

receive, from the user via the user interface and after the graphical representation of the second set of values of the plurality of characteristics is generated, a user-specified adjustment for the second cyber threat confidence score;

define a third cyber threat confidence score based on the user-specified adjustment for the second cyber threat confidence score;

calculate a third set of values of the plurality of characteristics of the potential cyber threat based at least in part on the third cyber threat confidence score; and provide to the user an indication of the third set of values of the plurality of characteristics.

* * * * *